United States Patent [19]
Sato

[11] Patent Number: 5,921,490
[45] Date of Patent: Jul. 13, 1999

[54] BAIT CASTING REEL WITH PARALLEL CONNECTED CLUTCH OPERATING LEVERS

[75] Inventor: Jun Sato, Sakai, Japan

[73] Assignee: Shimano, Inc., Japan

[21] Appl. No.: 08/976,828

[22] Filed: Nov. 24, 1997

Related U.S. Application Data

[63] Continuation of application No. 08/542,078, Oct. 12, 1995, abandoned.

[30] Foreign Application Priority Data

Oct. 17, 1994 [JP] Japan ..................................... 6-250820

[51] Int. Cl.$^6$ .................................................. A01K 89/00
[52] U.S. Cl. ............................................ 242/261; 242/262
[58] Field of Search .................................... 242/261, 262, 242/260, 259

[56] References Cited

U.S. PATENT DOCUMENTS

| | | | |
|---|---|---|---|
| 4,512,536 | 4/1985 | Sato | 242/218 |
| 4,709,874 | 12/1987 | Murakami | 242/261 |
| 5,158,245 | 10/1992 | Johansson | 242/261 |
| 5,188,312 | 2/1993 | Sato | 242/261 |
| 5,350,133 | 9/1994 | Morimoto | 242/261 |

FOREIGN PATENT DOCUMENTS

| | | | |
|---|---|---|---|
| 60-78526 | 5/1985 | Japan | 242/262 |
| 2260472 | 4/1993 | United Kingdom . | |

OTHER PUBLICATIONS

Copy of the European Patent Office Search Report dated Jan. 24, 1996, European Patent Application No. EP 95 307341.8 (3 sheets).

*Primary Examiner*—Donald P. Walsh
*Assistant Examiner*—Emmanuel M. Marcelo
*Attorney, Agent, or Firm*—Jeffer, Mangels, Butler & Marmaro LLP

[57] ABSTRACT

A double-bearing reel is equipped with a reel main body, which has a pair of side plates, a spool, a handle, a rotation transmitting mechanism which transmits the rotational force of the handle to the spool, a clutch mechanism which is used for the transmission or interruption of rotational force between the handle and spool, left and right levers, a thumb rest, and a connecting member. The left and right levers are respectively installed adjacent to the side plates, and are levers which are used to operate the clutch mechanism. The connecting member is installed below and behind the axis of rotation of the spool, and is a member which connects the left and right levers.

17 Claims, 5 Drawing Sheets

BAIT CASTING REEL WITH PARALLEL CONNECTED CLUTCH OPERATING LEVERS

This application is a continuation of application Ser. No. 08/542,078, filed Oct. 12, 1995, now abandoned.

FIELD OF THE INVENTION

The present invention relates to a double-bearing reel, and specifically concerns a double-bearing reel which has a clutch mechanism in the rotation transmitting mechanism installed between the handle and spool.

BACKGROUND OF THE INVENTION

Double-bearing reels used for fishing generally are designed as follows: a spool is supported between a pair of side plates forming the reel body, so that the spool is free to rotate, and this spool is caused to rotate by means of a handle which is installed on one side of the reel body. Furthermore, a rotation transmitting mechanism which includes a clutch mechanism (hereafter referred to simply as a "clutch") is installed between the handle and spool, so that the rotation of the handle can be transmitted to the spool, or the transmission can be interrupted.

Various types of operating mechanisms have been proposed in the past as mechanisms for placing the abovementioned clutch in an engaged ("on") or disengaged ("off") state. For example, devices have been proposed in which a thumb rest installed behind the spool is used as a clutch operating lever.

The present applicant has already proposed a device in which a separate clutch operating lever is installed above the spool in addition to a thumb rest used as a clutch operating lever as described above. This separate clutch operating lever is constructed as follows: a lever which is installed on one side plate above the spool, and a bridge which extends from the lever to the other side plate, are formed as an integral unit.

However, since the bridge is formed so that it covers the top of the spool, the following problem arises: in cases where the fishing line becomes tangled as a result of backlash, etc., the bridge becomes an obstacle so that handling of the tangled fishing line is difficult.

One object of the present invention is to facilitate handling of the fishing line in cases where the line becomes tangled around the spool in a reel in which respective levers for clutch operation are installed behind the spool and adjacent to both side plates of the reel main body.

Another object of the present invention is to prevent damage to the clutch operating levers and the members constituting the clutch operating mechanism, and to allow safer handling.

SUMMARY OF THE PREFERRED EMBODIMENTS

In accordance with one aspect of the present invention, there is provided an improved double-bearing reel. The reel is equipped with a reel main body which has a pair of side plates that are installed so that the side plates face each other across a prescribed gap, a spool, having an axis of rotation, which is installed between the pair of side plates so that the spool is free to rotate, a handle which is supported on the reel main body so that the handle is free to rotate, and which is used to rotate the spool, a rotation transmitting mechanism which transmits the rotational force from the handle to the spool, a clutch mechanism which is used for the transmission and interruption of rotational force between the handle and spool, a pair of clutch operating levers which are respectively installed adjacent to the pair of side plates, and which are used to operate the clutch mechanism, a connecting member which is installed below the axis of rotation of the spool, and which connects the pair of clutch operating levers, and a thumb rest which is installed to the rear of the spool between the pair of side plates, and which is used to operate the clutch mechanism.

The clutch mechanism is switched off by means of the clutch operating levers when the fishing line is to be paid out. As a result, the spool is not rotated by the rotation of the handle. After a prescribed length of fishing line has been paid out, the clutch operating levers are operated so that the clutch mechanism is switched on. In this state, the rotational force of the handle is transmitted to the spool by the rotation transmitting mechanism. Accordingly, the fishing line can be wound around the spool by operating the handle.

In this invention, clutch operating levers are installed on both of a pair of side plates. The clutch thus can be smoothly operated by thumbing with either the left hand or the right hand. Furthermore, the left and right levers are connected by a connecting member which is installed below the spool. The left and right levers can be connected without installing a member that creates an obstacle above the spool. Thus, handling of the fishing line in cases where the line has become wrapped around the spool is facilitated.

According to a preferred embodiment of the present invention, the inventive double-bearing reel is further equipped with a linking mechanism that links the clutch operating levers with the thumb rest. Operation of the clutch thus is further facilitated.

According to another preferred embodiment of the present invention, the connecting member is installed between the spool and the thumb rest. Accordingly, there is no need for any extra space, and the size of the reel can therefore be reduced. Furthermore, the connecting member is protected by the thumb rest. Moreover, if, the system is designed (in combination with the double-bearing reel of the foregoing preferred embodiment) so that the direction of operation of the connecting member when the clutch operating levers are operated and the direction of linked movement of the thumb rest are the same direction, then the connecting member is always positioned to the inside of the thumb rest, so that the connecting member is not exposed.

According to yet another preferred embodiment of the present invention, the inventive double-bearing reel is further equipped with a shock-absorbing mechanism, preferably installed between the operating levers and the clutch mechanism. In this embodiment, even if the clutch is switched "on" by means of the thumb rest or handle with the clutch operating levers in a clutch-"off" state, damage to the levers or members forming the clutch mechanism can be avoided.

According to a further preferred embodiment of the present invention, the foregoing clutch mechanism includes a clutch cam, and a pivoting member to which one of the clutch operating levers is affixed. The foregoing shock-absorbing mechanism includes an engaging projection which is formed either on the pivoting member or the clutch cam, an engaging recess which is formed in the other of the two parts mentioned above, and which engages with the engaging projection so that relative movement is possible only through a prescribed range, and an urging member which urges the clutch operating levers in a prescribed direction. In this embodiment, the structure is simple.

In accordance with another aspect of the invention, there is provided a double-bearing reel comprising a reel main body which includes comprising a pair of opposed side plates; a spool having an upper portion, the spool being installed between the pair of side plates; a handle; a rotation transmitting mechanism which transmits rotational force from the handle to the spool; a clutch mechanism for transmission and interruption of rotational force between the handle and the spool; a pair of clutch operating levers which are respectively installed adjacent to the pair of side plates and which are used to operate the clutch mechanism; a connecting member which connects the pair of clutch operating levers without obstructing access to the upper portion of the spool; and a thumb rest which is installed between the pair of side plates and which is used to operate the clutch mechanism.

In accordance with a further aspect of the invention, there is provided a double-bearing reel which includes: a reel main body comprising a pair of opposed side plates; a spool having an upper portion and a spool shaft, the spool being installed between the pair of side plates; a handle; a rotation transmitting mechanism which transmits rotational force from the handle to the spool; a clutch mechanism for transmission and interruption of rotational force between the handle and the spool, the clutch mechanism including a clutch yoke installed around the spool shaft, a clutch cam which is pivotable about the spool shaft and which includes a disk on which are formed cam surfaces that contact the clutch yoke, a lever attachment element extending upward from the disk, and a back surface, and a clutch plate which includes an engaging element which engages with the back surface of the clutch cam and a second lever attachment element; a plate; a pair of opposed clutch operating levers which are respectively installed adjacent to the pair of side plates and which are used to operate the clutch mechanism, wherein one of the clutch operating levers is mounted on the lever attachment element of the clutch cam and the other of the clutch operating levers is mounted on the plate; a connecting member which links the pair of clutch operating levers without obstructing access to the upper portion of the spool; and a thumb rest which is attached to the second lever attachment element and is installed between the pair of side plates and which is used to operate the clutch mechanism.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
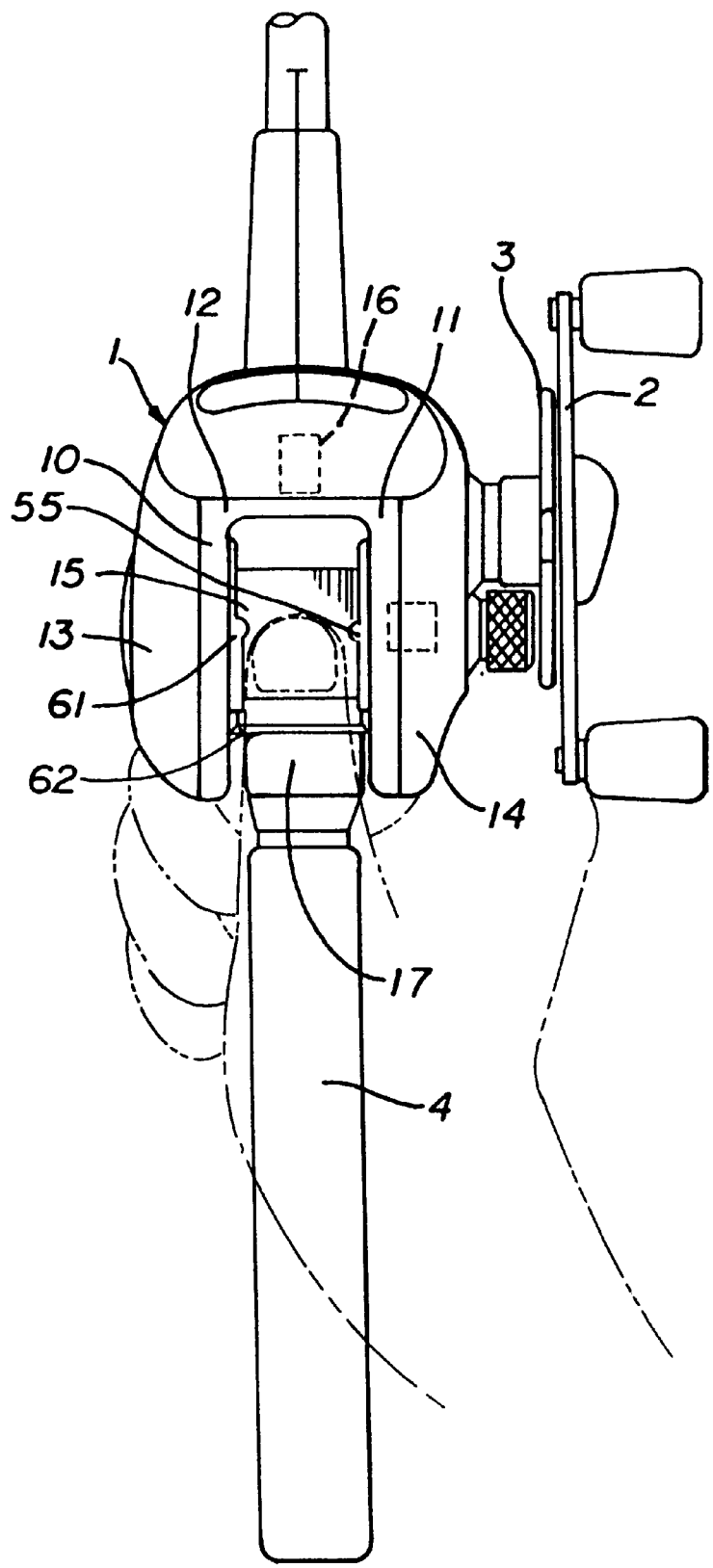
FIG. 1 is a plan view of a double-bearing reel constructed according to one embodiment of the present invention.
Figure 2:
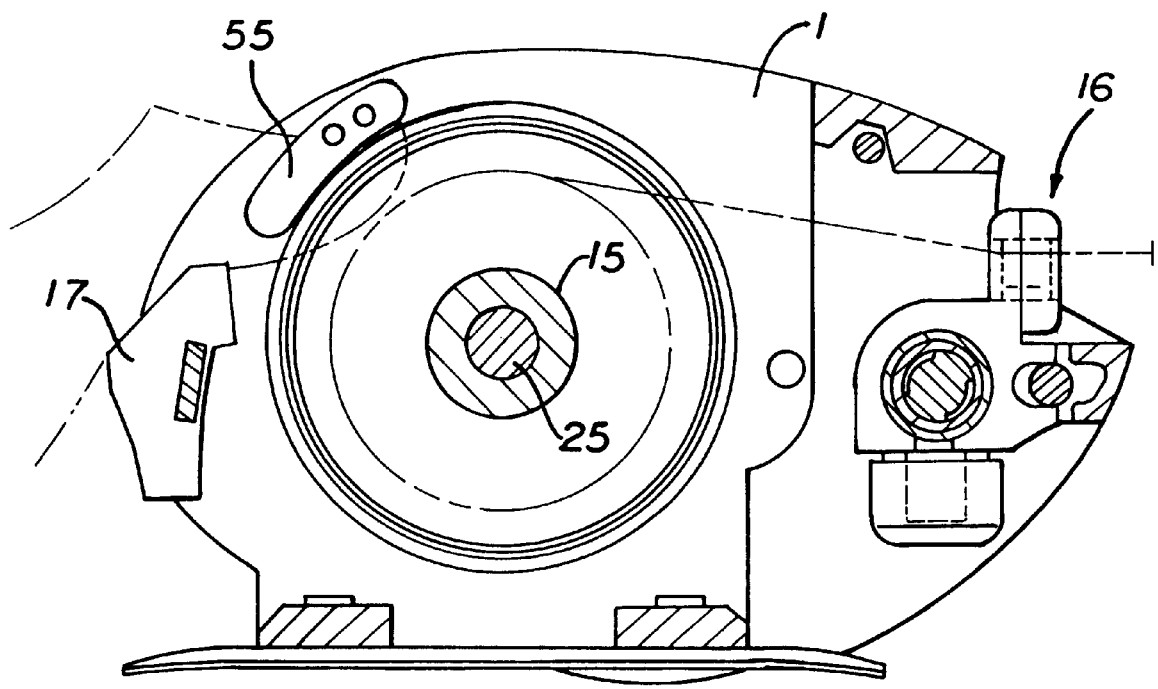
FIG. 2 is a sectional side view of the double-bearing reel.

The double-bearing reel shown in FIGS. 1 and 2 is equipped with a reel main body 1, a handle 2 (used to rotate the spool) which is installed on one side of the reel main body 1, and a brake knob 3 (used for brake adjustment) which is installed on the reel main body side of the handle 2. The reel main body 1 is fastened to a fishing rod 4 via a reel attachment member.

The reel main body 1 has a frame 12 which has a pair of side plates 10, 11 that are installed on either side of a defined gap, and a first cover 13 and second cover 14 which are respectively mounted on both sides of the frame 12. A spool 15 having an upper portion 15a is installed between the pair of side plates 10, 11 so that the spool 15 is free to rotate. A level winding mechanism 16 which is used to wind the fishing line uniformly on the spool 15 is installed in front of the spool 15, and a thumb rest 17 is installed to the rear of the spool 15. Furthermore, an opening is formed in the reel main body 1 above the spool 15, so that thumbing can be performed by inserting the thumb into the opening.

Figure 3:
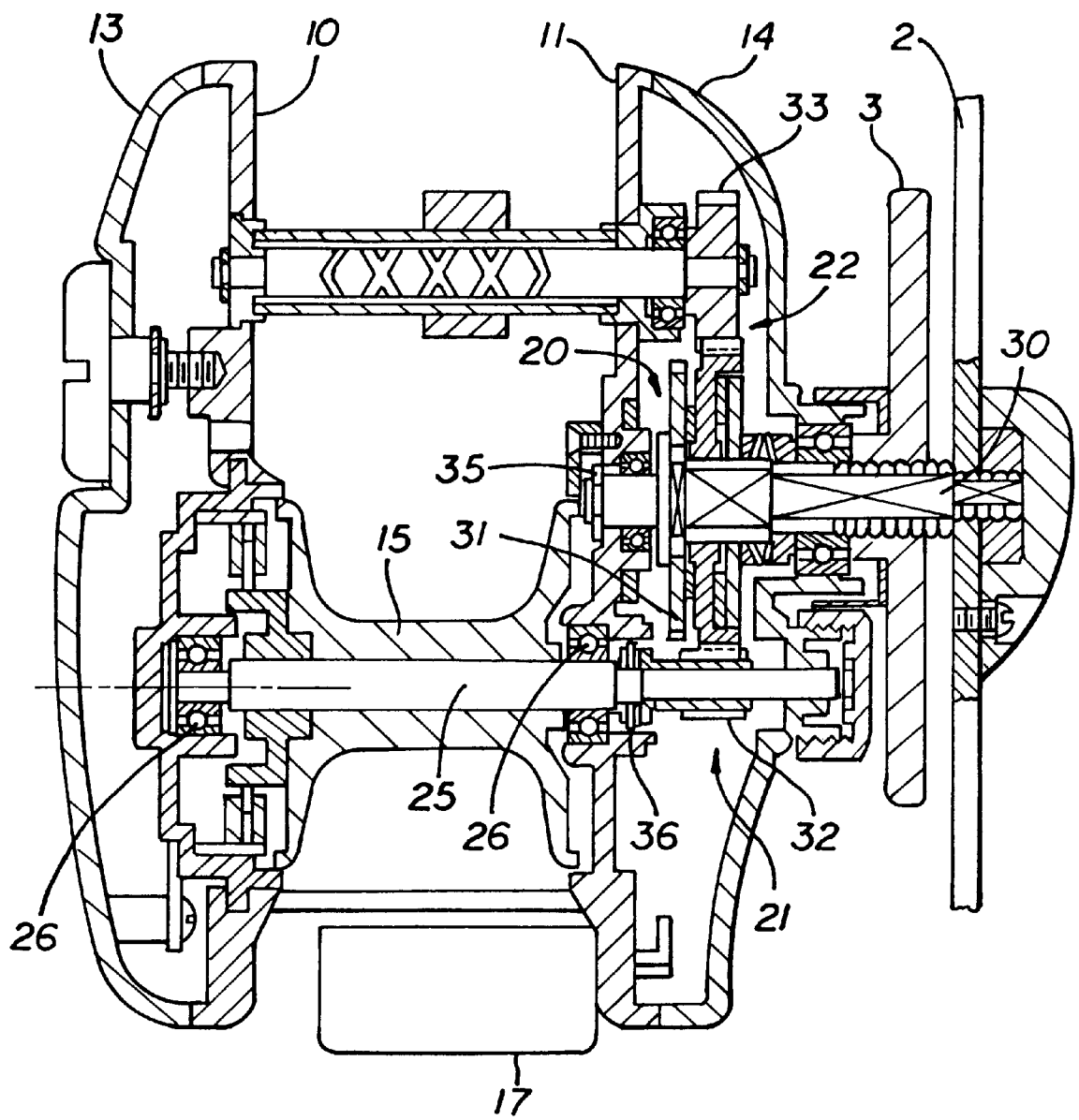
FIG. 3 is a sectional plan view of the double-bearing reel.

As is shown in FIG. 3, a rotation transmitting mechanism which is used to transmit the rotational force of the handle 2 to the spool 15 and level winding mechanism 16, and a clutch mechanism 21, which is installed inside the rotation transmitting mechanism 20, are installed inside the second cover 14 on the outside of the side plate 11. The rotation transmitting mechanism 20 includes a drag mechanism 22 which regulates the rotational force in cases where a rotational force is transmitted back to the handle 2 from the spool 15.

A spool shaft 25 is fastened to the center of the spool 15. This spool shaft 25 is supported on the side plates 10, 11 via bearings 26 so that the spool shaft 25 is free to rotate.

The rotation transmitting mechanism 20 has a handle shaft 30, to one end of which the handle 2 is fastened, a main gear 31 which is connected to the other end of the handle shaft 30 via the drag mechanism, and a pinion gear 32 which engages with the main gear 31. Furthermore, a gear 33 which forms a part of the level winding mechanism 16 engages with the main gear 31.

The handle shaft 30 is installed parallel to the spool shaft 25, and one end of the handle shaft 30 is supported on the side plate 11 via a bearing 35 so that the handle shaft 30 is free to rotate. The main gear 31 can be connected to one end of the handle shaft 30 via the drag mechanism so that relative rotation is impossible. In the case of such a construction, when the clutch mechanism 21 is switched "on", the rotation of the handle 2 is transmitted directly to the spool 15.

The pinion gear 32 is formed in a cylindrical shape, and is mounted on the outer circumferential portion of the spool shaft 25 so that the pinion gear 32 is free to slide. An engaging groove is formed in the end portion of the pinion gear 32 that is adjacent to the spool, and a pin 36 which is fastened to the spool shaft 25 is capable of engaging with this groove. Specifically, when the pin 36 and the engaging groove are engaged (i. e., in the state shown in FIG. 3), the clutch is in an "on" state. On the other hand, when the pinion gear 32 is moved to the right from the position shown in FIG. 3, the engagement between the pin 36 and the engaging groove is released, so that the clutch is switched "off".

Thus, the clutch mechanism 21 is formed by the engaging groove of the pinion gear 32 and the pin 36 fastened to the spool shaft 25.

Next, the clutch operating mechanism which is used to operate the clutch mechanism will be described.

Figure 4:
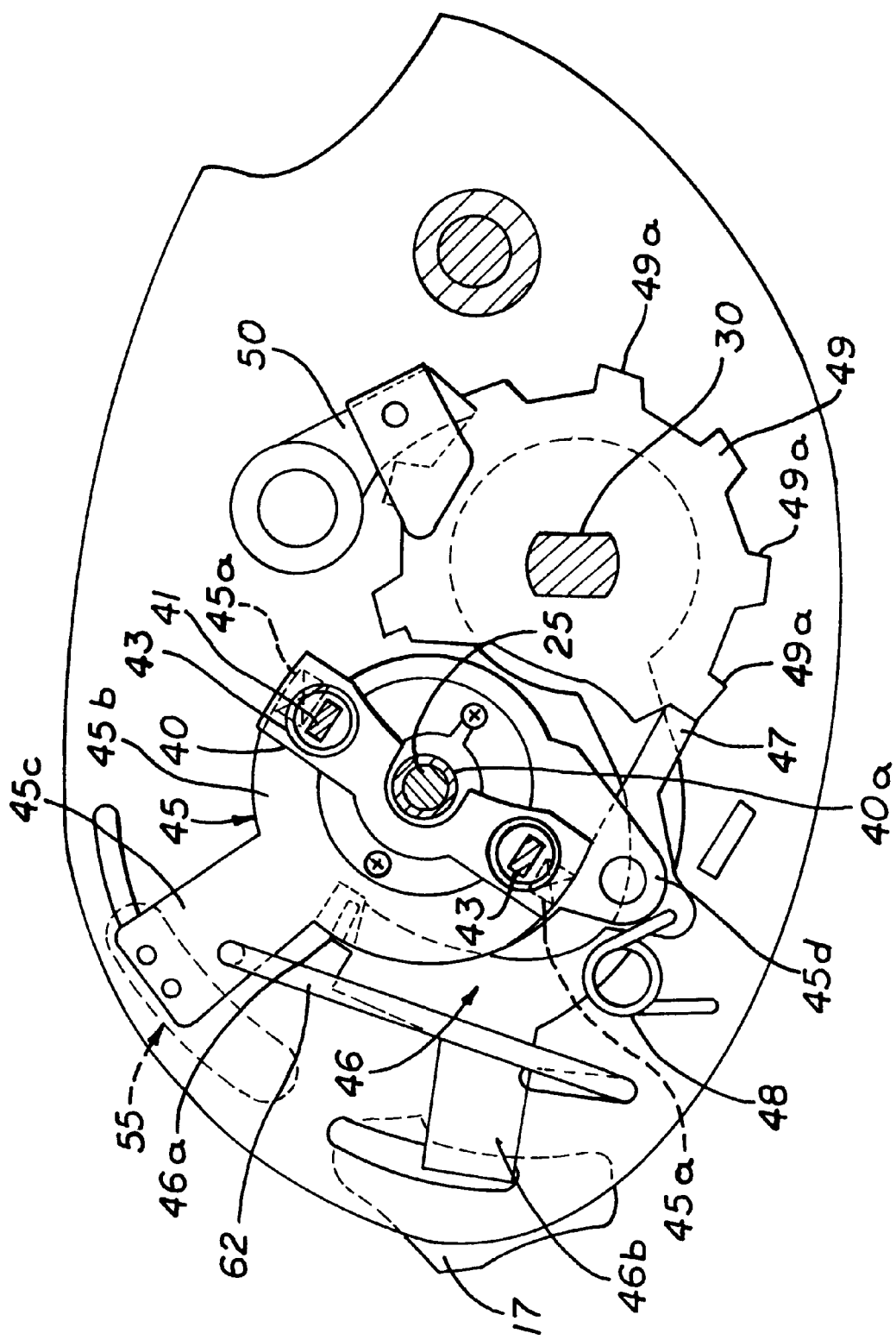
FIG. 4 is a side view of the double-bearing reel with the covers removed.

As is shown in FIG. 4, the clutch operating mechanism has a clutch yoke 40. This clutch yoke 40 is installed around the outer circumference of the spool shaft 25, and can be moved parallel to the spool shaft 25 by means of two supporting shafts 41, 42 which are installed in opposite positions. Furthermore, the spool shaft 25 is capable of rotating relative to the clutch yoke 40. Specifically, the system is arranged so that even if the spool shaft 25 rotates, the clutch yoke 40 does not rotate. Furthermore, the clutch yoke 40 has in its central portion an engaging element 40a which engages with a portion of the pinion gear 32. Moreover, springs 43 are mounted between the clutch yoke 40 and the second cover 14 on the outer circumferences of the respective supporting shafts 41, 42 that support the clutch yoke 40. As a result, the clutch yoke 40 is constantly urged inward (toward the spool 15) by the springs 43.

In the case of such a construction, the pinion gear 32 is ordinarily positioned in the inner clutch engagement position so that the engaging groove of the pinion gear 32 and the pin 36 are engaged. As a result, the clutch is "on". Meanwhile, when the pinion gear 32 is moved outward by means of the clutch yoke 40, the engagement of the engaging groove and pin 36 is released, so that the clutch is switched "off".

The clutch operating mechanism also has a clutch cam 45, a clutch plate 46, and a clutch release member 47 which is installed beneath the clutch cam 45.

The clutch cam 45 is free to pivot about the spool shaft 25, and has a disk 45b on which cam surfaces 45a are formed in two opposite locations, a lever attachment element 45c which extends upward from the disk 45b, and a projecting element 45d on which the clutch release member 47 is mounted. The cam surfaces 45a contact the back surface 40b of the clutch yoke 40, and the system is arranged so that when the clutch plate 46 pivots, the clutch yoke 40 is caused to move outward against the driving force of the springs 43. The clutch plate 46 is free to pivot about the handle shaft 30, and an engaging element 46a which engages with the back surface 45e of the clutch cam 45 is formed on a portion of the clutch plate 46.

In addition, a second lever attachment element 46b which extends toward the rear is also formed on the clutch plate 46. This second lever attachment element 46b extends between the pair of side plates 10, 11 via a cut-out 1a formed in the reel main body 1. The clutch release member 47 is attached to the projecting element 45d of the clutch cam 45 so that the clutch release member 47 is free to pivot. This clutch release member 47 can be caused by means of a toggle spring 48 to assume either a contact position in which the clutch release member 47 contacts one of the teeth 49a of a ratchet wheel 49, or a non-contact position in which the clutch release member 47 does not interfere with the teeth 49a. Furthermore, a stopper 50 which prevents the rotation of the handle shaft 30 in one direction when the clutch is "off" is installed above the ratchet wheel 49.

A right lever 55 which is used to operate the clutch is mounted on the tip end of the lever attachment element 45c of the clutch cam 45. As is shown in FIGS. 1 and 2, this right lever 55 is mounted adjacent to the inside surface of the side plate 11, and is free to move through a prescribed range which runs more or less along the outer circumference of the spool 15. Furthermore, thumb rest 17 is attached to the tip end of the second lever attachment element 46b of the clutch plate 46. Thumb rest 17 is installed behind the spool 15 between the side plates 10 and 11, and is free to move upward and downward through a prescribed range.

Figure 5:
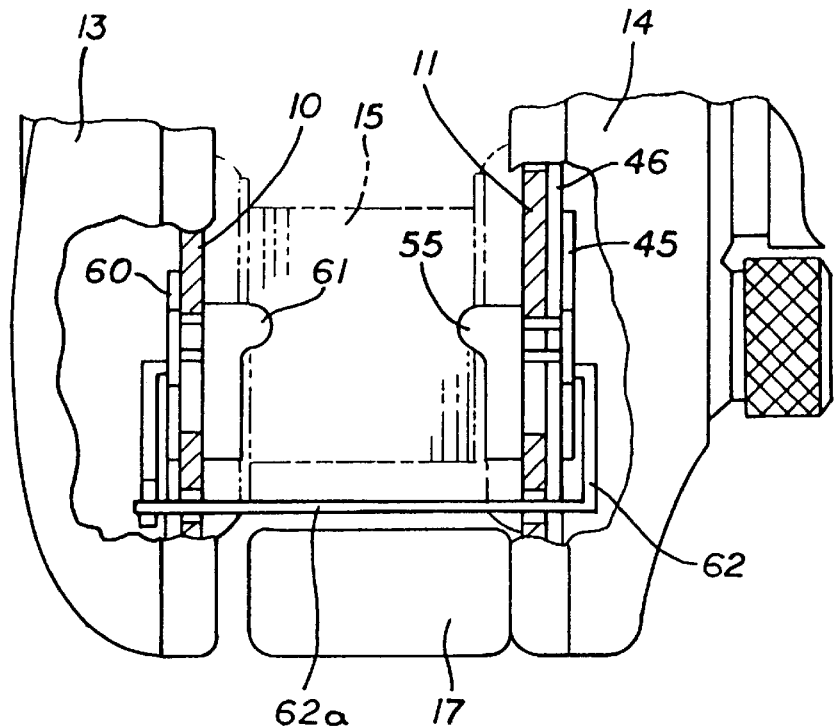
FIG. 5 is a magnified partial view of FIG. 1.

FIG. 4 shows the construction inside the second cover 14. However, a clutch operating mechanism is also installed inside the first cover 13. Specifically, as is shown in FIG. 5, a plate 60 which corresponds to the clutch cam 45 is installed so that the plate 60 can pivot more or less along the outer circumference of the spool 15, and a left lever 61 is mounted on the tip end of the plate 60. This left lever 61 is mounted adjacent to the inside surface of the side plate 10, so that the left and right levers 61 and 55 face each other. Furthermore, as is shown in FIGS. 4 and 5, a connecting member 62 which is used to link the left and right levers 55 and 61 is installed between the clutch cam 45 and plate 60. The portion 62a of the connecting member 62 which is located between the sides plates 10 and 11 is positioned behind the spool 15 at a level lower than the spool shaft 25.

Next, the operation of the above mechanism will be described.

Under ordinary conditions, the clutch yoke 40 is pushed toward the spool 15 by the springs 43, so that the pinion gear 32 is moved into the clutch engagement position. In this state, the engaging groove of the pinion 32 and the pin 36 are engaged so that the clutch is "on". Accordingly, the rotational force of the handle 2 is transmitted to the spool shaft 25 and spool 15 via the handle shaft 30, main gear 31 and pinion gear 32.

When fishing is engaged in, the hook is first baited; then, as is shown in FIG. 1, the body of the thumb is placed over the spool 15, and is further placed on the thumb rest 17. Next, when the thumb rest 17 is pressed downward with the base portion of the thumb, the clutch plate 46, and thus also engaging element 46a, pivot in the counterclockwise direction (with respect to FIG. 4). Clutch cam 45 pivots in the same direction due to urging by engaging element 46a. Accordingly, the cam surfaces 45a of the clutch cam 45 drive the clutch yoke 40 outward. Consequently, the engagement of the engaging groove of the pinion gear 32 and the pin 36 is released, so that the clutch is switched "off". In this state, the fishing line can be paid out at the desired speed by thumbing.

When the desired length of fishing line has been paid out, the clutch is switched "on" in order to stop the paying out of the fishing line. In this case, either the left or right lever 61 or 55 (both of which project toward the spool 15 from their positions adjacent to the side plates 10 and 11) is pushed forward with the thumb that was used for thumbing. As a result, the clutch cam 45 pivots in the clockwise direction (with respect to FIG. 4). Consequently, the clutch yoke 40 is moved inward by the springs 43. Accordingly, the clutch is switched "on" so that the paying out of the fishing line is stopped. Here, when either of the two levers (55 or 61) is pressed, both levers are caused to move in a linked motion by the connecting member 62.

Alternatively, with the clutch "off", the handle shaft 30 and the ratchet wheel 49 are caused to rotate by the handle 2. As a result, the clutch cam 45 is caused to pivot in the clockwise direction (with respect to FIG. 4) via the clutch release member 47 so that the clutch is switched "on".

Thus, in the present embodiment, clutch operating levers 55 and 61 are installed adjacent to both inside surfaces of the side plates 10 and 11. Accordingly, operation of the clutch during thumbing is facilitated. Furthermore since the left and right levers 61, 55 are linked by the connecting member 62, the structure is simpler than in cases where the respective levers 61, 55 are connected to, e.g., the clutch yoke 40. In addition, since the left and right levers 61, 55 and the thumb rest 17 are linked via the clutch cam 45 and clutch plate 46, operation of the clutch can be accomplished more smoothly.

Furthermore, since the connecting member 62 is positioned behind the spool 15 and at a level lower than the spool shaft 25 between the side plates, the connecting member 62 does not interfere with the handling of the fishing line paid out from the spool 15.

Figure 6:
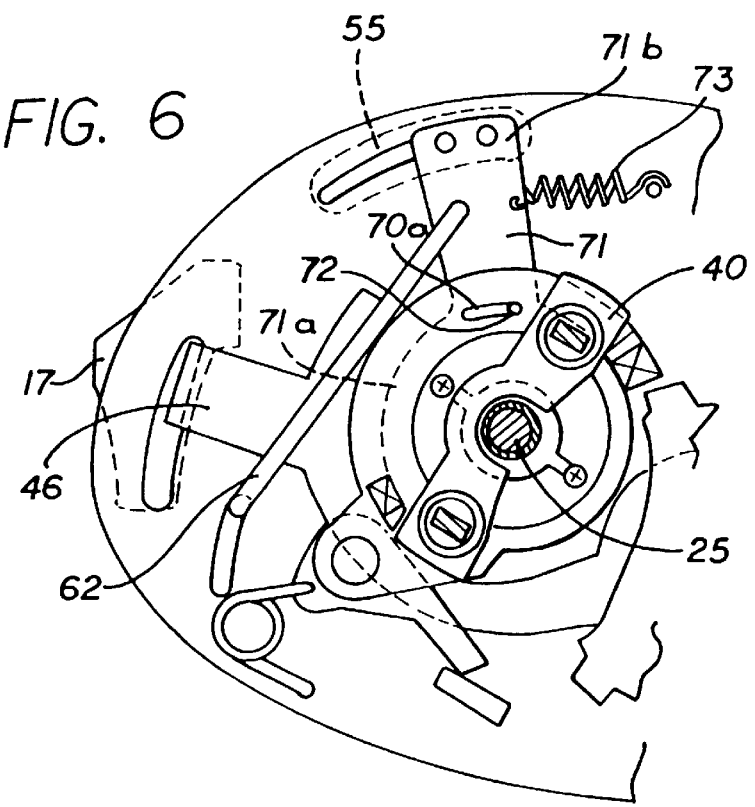
FIG. 6 is an illustration of another embodiment of the present invention (corresponding to FIG. 4).

FIG. 6 shows another example of the clutch operating mechanism which operates together with a shock absorbing mechanism.

In this example, a clutch cam 70 and a pivoting member 71 which is connected to the right lever 55 are formed as separate members. This clutch cam 70 differs from the clutch cam in the previous embodiment only in that the clutch cam 70 is formed in a more or less circular shape. The remaining construction is similar to that of the previous embodiment. Furthermore, a circular-arc-form through-hole 70*a* (i.e., an engaging recess) is formed in this clutch cam 70. Moreover, the pivoting member 71 has a disk-form main body 71*a* and an extension 71*b* which extends upward from the main body 71*a*. Furthermore, the pivoting member 71 is free to pivot about the spool shaft 25. A pin 72 (i.e., engaging projection) is installed on the main body 71*a*. This pin 72 engages with the through-hole 70*a* of the clutch cam 70. Accordingly, the pivoting member 71 is capable of rotating relative to the clutch cam 70 only within the range of the through-hole 70*a*.

Furthermore, the right lever 55 is mounted on the tip end of the extension 71*b*. In addition, one end of a return spring 73 is anchored to the extension 71*b*, and the other end of the return spring 73 is anchored to the reel body. The pivoting member 71 is constantly urged in the clockwise direction (with respect to FIG. 5) by this return spring 73.

In this example, when the clutch is switched "on" by the rotation of the handle, the clutch cam 70 alone can be switched to the clutch-"on" attitude by the engagement of the circular-arc-form through hole 70*a* and pin 72, even if the movement of the right lever 55 is hindered by the fingers, etc. Then, after this hindrance (fingers, etc.) is removed, the pivoting member 71 is returned to the clutch—"on" position by the return spring 73.

In this way, damage to the members forming the clutch mechanism due to forced operation can be prevented.

Alternatively, the positions of circular-arc-form throughhole 70*a* (engaging recess) and pin 72 (engaging projection) can be interchanged. That is, throughhole 70*a* can be formed in main body 71*a,* and pin 72 can be installed on clutch cam 70.

What is claimed is:

1. A double-bearing reel comprising:
   a reel main body which has a pair of side plates that are installed so that said side plates face each other across a prescribed gap;
   a spool having an axis of rotation, wherein said spool is installed between said pair of side plates so that said spool is free to rotate;
   a handle which is supported on said reel main body so that said handle is free to rotate, and which is used to rotate said spool;
   a rotation transmitting mechanism which transmits rotational force from said handle to said spool;
   a clutch mechanism for transmission and interruption of rotational force between said handle and spool;
   a pair of opposed clutch operating levers each of which is installed adjacent to a separate one of said pair of side plates and which are used to operate said clutch mechanism;
   a connecting member which is installed below said axis of rotation of said spool, and which connects said pair of opposed clutch operating levers; and
   a thumb rest which is installed behind said spool between said pair of side plates and which is used to operate said clutch mechanism.

2. A double-bearing reel as defined in claim 1 further comprising a linking mechanism that links said clutch operating levers with said thumb rest.

3. A double-bearing reel as defined in claim 2 wherein said linking mechanism includes a clutch cam on which one of said clutch operating levers is mounted, said clutch cam having a back surface, and a clutch plate having an engaging element which engages with said back surface of said clutch cam.

4. A double-bearing reel as defined in claim 1 wherein said connecting member is installed between said spool and said thumb rest.

5. A double-bearing reel as defined in claim 1 further comprising a plate on which one of said clutch operating levers is mounted.

6. A double-bearing reel as defined in claim 1 further comprising a shock-absorbing mechanism.

7. A double-bearing reel as defined in claim 6, wherein
   (a) said clutch mechanism includes a clutch cam and a pivoting member to which one of said clutch operating levers is affixed, and
   (b) said shock-absorbing mechanism includes an engaging projection which is formed on said pivoting member, an engaging recess which is formed in said clutch cam and which engages with said engaging projection so that relative movement is possible only through a defined range, and an urging member which urges said clutch operating levers in a defined direction.

8. A double-bearing reel as defined in claim 7 wherein said urging member is a spring.

9. A double-bearing reel as defined in claim 6 wherein said shock-absorbing mechanism includes an engaging projection which is formed on said clutch cam, an engaging recess which is formed in said pivoting member and which engages with said engaging projection so that relative movement is possible only through a defined range, and an urging member which urges said clutch operating levers in a defined direction.

10. A double-bearing reel as defined in claim 9 wherein said urging member is a spring.

11. A double-bearing reel comprising:
    a reel main body comprising a pair of opposed side plates;
    a spool having an upper portion, said spool being installed between said pair of side plates;
    a handle;
    a rotation transmitting mechanism which transmits rotational force from said handle to said spool;
    a clutch mechanism for transmission and interruption of rotational force between said handle and spool;
    a pair of opposed clutch operating levers each of which is installed adjacent to a separate one of said pair of side plates and which are used to operate said clutch mechanism;
    a connecting member which connects said pair of opposed clutch operating levers without obstructing access to said upper portion of said spool; and
    a thumb rest which is installed between said pair of side plates, and which is used to operate said clutch mechanism.

12. A double-bearing reel as defined in claim 11 further comprising a linking mechanism that links said clutch operating levers with said thumb rest.

13. A double-bearing reel as defined in claim 12 wherein said linking mechanism includes a clutch cam on which one of said clutch operating levers is mounted, said clutch cam having a back surface, and a clutch plate having an engaging element which engages with said back surface of said clutch cam.

14. A double-bearing reel as defined in claim 11 wherein said connecting member is installed between said spool and said thumb rest.

15. A double-bearing reel as defined in claim 11 further comprising a plate on which one of said clutch operating levers is mounted.

16. A double-bearing reel as defined in claim 11 further comprising a shock absorbing mechanism.

17. A double-bearing reel comprising:
- a reel main body comprising a pair of opposed side plates;
- a spool having an upper portion and a spool shaft, said spool being installed between said pair of side plates;
- a handle;
- a rotation transmitting mechanism which transmits rotational force from said handle to said spool;
- a clutch mechanism for transmission and interruption of rotational force between said handle and spool, said clutch mechanism including a clutch yoke installed around said spool shaft, said clutch yoke having a back surface, a clutch cam which is pivotable about said spool shaft and which includes a disk on which are formed cam surfaces that contact said back surface of said clutch yoke, a lever attachment element extending upward from said disk, and a back surface, and a clutch plate which includes an engaging element which engages with said back surface of said clutch cam and a second lever attachment element;
- a plate;
- a pair of opposed clutch operating levers which are respectively installed adjacent to said pair of side plates, and which are used to operate said clutch mechanism, wherein one of said clutch operating levers is mounted on said lever attachment element of said clutch cam and the other of said clutch operating levers is mounted on said plate;
- a connecting member which links said pair of clutch operating levers without obstructing access to said upper portion of said spool; and
- a thumb rest which is attached to said second lever attachment element and is installed between said pair of side plates, and which is used to operate said clutch mechanism.

* * * * *